Patented Sept. 3, 1940

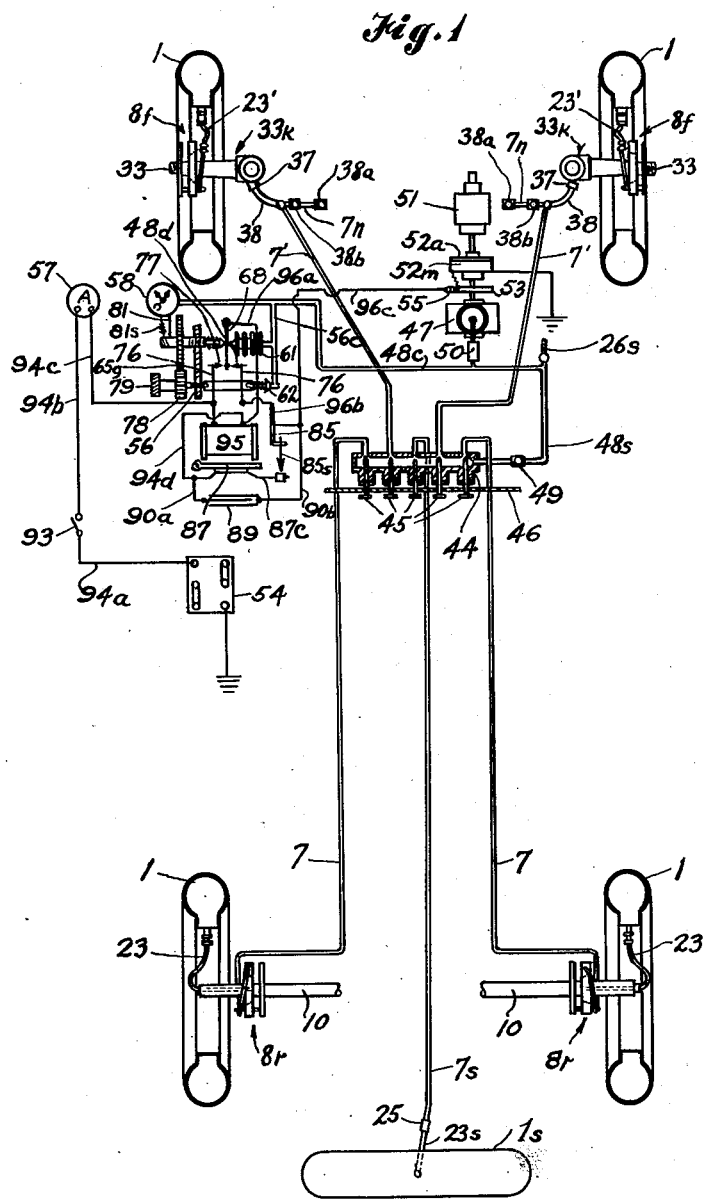

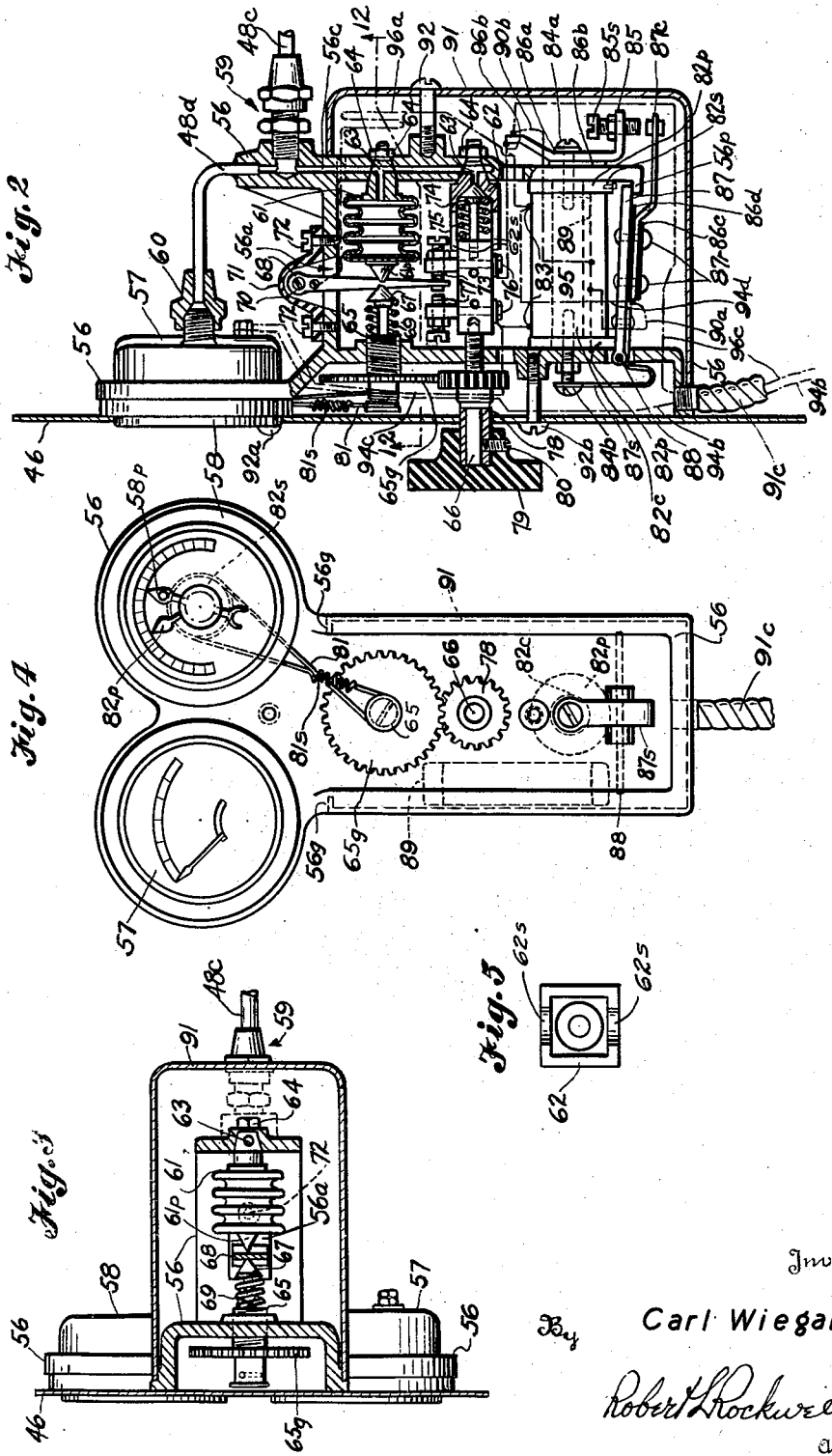

2,213,539

UNITED STATES PATENT OFFICE 2,213,539

CONTROL UNIT FOR TIRE INFLATION SYSTEMS

Carl Wiegand, Seattle, Wash.

Original application June 15, 1937, Serial No. 148,422, now Patent No. 2,146,102, dated February 7, 1939. Divided and this application September 19, 1938, Serial No. 230,584

9 Claims. (Cl. 152—416)

This invention relates to control units for tire inflation systems that are permanently associated with automotive vehicles for inflating or deflating the tires thereof while in motion, and is particularly adapted for use in the Tire inflation system set forth in my co-pending application, Serial No. 148,422, filed June 15, 1937, of which this application is a division, and which matured into Patent No. 2,146,102, dated February 7, 1939.

The invention embraces in cooperative combination in a compact unit those control elements of the said system whereby the air pressure in the tires of the vehicle may be observed, adjusted manually to different desired pressures and maintained automatically at any said desired pressure within the operating limits of the equipment.

The control unit of my invention is adapted to be employed, however, in connection with any tire inflation system that comprises a source for supplying air or other fluid under pressure through a comprehensive system of conduits to the several rotating pneumatic tires of the vehicle, through the intermediacy of suitable rotary air lead connectors, such as are illustrated and described in Letters Patent of the United States No. 2,090,089, granted to me under date of Aug. 17, 1937, on application Serial No. 38,135, filed Aug. 27, 1935, of which the aforesaid co-pending application, Serial No. 148,422, is a continuation in part.

When my control unit is employed in such a system, in case the fluid pressure in the tires of a vehicle equipped therewith should decrease below the desired value due to a small puncture, slow leak or the like, a pressure control device automatically connects the source of air under pressure to the system of conduits, and air is forced thereby into the tires until a pre-determined pressure is reached, then the pressure control element of the control means operates automatically to disconnect said source from the system.

An indicator element of the control unit shows when the source is connected to the conduit system, hence the duration and frequency of its use periods under automatic control are indicative of the air leak conditions of the tires or other parts of the system.

Whenever the tires become heated and the air therein expands, or for any other reason the air pressure increases above the desired value, the pressure release element of the control unit automatically allows air to escape until the tire pressure falls to the desired value.

By means of a plurality of coacting elements of the control units, the mechanism thereof may be adjusted manually to an indicated desired lower value when lower tire pressures are wanted, as when leaving paving to traverse a less favorable stretch of road. This adjusts the air pressure release element to a lower value and permits the air to escape until the lower pressure is obtained, where it again is maintained automatically at said lower pressure. When paving is again available the control unit may be re-adjusted for the higher pressure, whereupon the source of air again is connected to the conduit system until the higher pressure is had, whereupon it again is disconnected automatically as previously stated.

In like manner the air pressure in the tires may be increased or decreased for the heavier or lighter loading of trucks, respectively, or for larger or smaller numbers of persons carried by busses, thus assuring less chassis vibration, more comfortable riding qualities and longer life for the tires.

In the event of a large air leak in any tire or its connecting conduit, the coacting elements of the control unit automatically connect the source of air under pressure with the conduit system to maintain the pressure in the tire. This retards the loss of pressure in the punctured tire, and often permits the vehicle to be driven to a stop or to a place where it can be stopped safely and the faulty tire repaired or replaced with a spare. This is of particular importance on crowded highways, in stormy weather or with women drivers.

An object of the invention is to provide a control unit for tire inflation systems that is simple and compact in construction, easy to install and maintain, reliable in operation, and simple to manipulate.

Another object is to provide a control unit of the class described in which the coacting parts provide for both manual and automatic control of the air pressure for tire inflation systems with which are cooperatively associated pressure indicating and use indicating means to form a simple, compact, reliable and readily accessible unit for installation within the driver's sight and reach, preferably on the instrument board of the vehicle.

Other objects and advantages will be apparent to those skilled in the art from the following detailed description of a preferred form of the invention, which consists of certain parts and combination of parts, hereinafter described, illustrated in the accompanying drawings and embraced in the appended claims.

In the drawings:

Figure 1 is a diagram indicating the relative cooperative positions of the several coacting elements of the control unit employed in connection with one form of tire inflation system as applied to a conventional automatic vehicle.

Fig. 2 is a side elevation of the air pressure control unit with a medial section through a portion of the frame and the enclosing cover, and through some of the other parts.

Fig. 3 is a sectional end elevation of said control unit taken on broken line 12—12 of Fig. 2, with the pointer cable removed.

Fig. 4 is a front elevation of the control unit removed from the instrument board.

Fig. 5 is an end view of the combined removable seat of the pressure release element and guide employed for certain of the other parts associated therewith, to a larger scale.

Like reference numerals are used to indicate like parts throughout the drawings.

*Tire inflation system*

Referring to the diagrammatic representation in Fig. 1, it will be seen that tires 1 and 1s are interconnected to a manifold unit 44 by means of tubular leads 7 for the rear wheel tires, by tubular leads 7' for the front wheel tires and by tubular leads 7s for the spare tire 1s.

Connection may be made between tubular conduit leads 7 and the rear wheel tires by means of my rear-wheel conduit lead rotary connectors 8r, preferably positioned within and near the outer end of the rear axle housings, not shown, the inner elements of said connectors being mounted on rear wheel shafts 10 which are drilled to connect with a section of flexible tubing 23.

Likewise, connection between conduit leads 7' and the front wheel tires may be made by means of my front-wheel conduit lead rotary connectors 8f, preferably positioned within the hub housings of the front wheels. The inner elements of said rotary connectors are fixedly secured to spindles 33 of steering knuckle 33k which are drilled and plugged to provide a conduit connection between the apertures in said stationary element of said connectors and connector fittings 37, which are screwed into threaded apertures connecting with said conduits of the steering knuckles. Said connector fittings are adapted to receive one end of flexible tubing sections 38, which in turn are connected by means of suitable fittings to the ends of tubes 7' jointly with vertically disposed valves 38b, nipples 7n and valves 38a, the same being adapted to facilitate replenishing the supply of oil used to lubricate said connectors 8f.

The details of construction and mode of application of my air lead rotary connectors, herein represented diagrammatically by numerals 8r and 8f, are illustrated and described in my aforesaid Patent No. 2,090,089.

Valve manifold 44 comprises a hollow body in which a plurality of valve elements 45 may be mounted, together with suitable means, not shown, for connecting said body portion to the ends of the several tubular leads 7, 7', 7s and 48s, respectively, and for fixedly positioning the body of the manifold behind instrument panel 46 of the vehicle, with the valve stems passing through apertures therefor in said panel so knurled heads 45 thereof are within easy reach of the driver. A separate valve element may be provided for each tubular air lead connected to said manifold as shown in Fig. 1. By means of the aforesaid valves the flow of air in rear wheel conduit leads 7, front wheel conduit leads 7' and conduit lead 7s, to flexible tubing 23s and spare tire 1s, can be controlled quickly and easily, so the facilities of the system may be utilized to the best advantage.

The manifold body chamber is connected to a source of fluid under pressure 47 through a run of tubing 48s containing a shut-off valve 49 and a check valve 50. When air brakes are not used, I prefer to employ an air compressor as my fluid supply means as shown in Fig. 1. Connection is made also to the air pressure control device, hereinafter described, by means of tubing 48c. A modified tire valve and stem 26s may be provided in the run of tubing 48s to facilitate connection with service air leads for emergency inflation of tires, testing or other purposes. Air compressor 47 may be driven by the projecting end of the shaft of the usual electric generator 51, which in turn is driven by the vehicle's engine, not shown.

To complete the driving connection between the compressor and generator shafts, I prefer to use an electro-magnet clutch having an armature portion 52a and an electro-magnet body portion 52m. One end of the winding of said clutch is "grounded" to said body portion and through it to the frame of the vehicle, and the other end is connected to an insulated slip ring 53 fixedly mounted on the clutch shaft. The vehicle's metal frame (not shown) conducts the current from the "grounded" end of said winding to the "grounded" terminal of the usual storage battery 54, which may be charged by generator 51. Connection to slip ring 53 is made through brush 55.

It will be apparent that so long as the engine is running the air compressor may be started at any time by energizing the electro-magnet clutch. Because of the high inductance of the clutch winding circuit, the current builds up slowly and the grip of the clutch is exerted gradually, thus enabling the air compressor to be started without undue jerk. Obviously the air compressor may be stopped by simply opening the electro-magnet clutch circuit at any point.

*Fluid pressure control mechanism*

In order to exercise both automatic and manual control of the fluid pressure in the tires, I make use of the device illustrated in Figs. 2, 3, 4 and 5, the diagrammatic electrical and conduit connections of which are shown in Fig. 1.

The several elements to be used for fluid pressure control are mounted in cooperative relation in a frame 56 which may be an inexpensive die casting of non-magnetic material. One leg of said frame forms the base which is extended upwardly to provide two apertures into which current flow indicator 57 and pressure gauge 58 are pressed. The leg opposite is provided with a conduit 56c to which tubing 48c is joined by a standard connector fitting 59. A length of straight tubing 48d is inserted in the enlarged end of said conduit and secured to the frame by soldering or brazing, and is later bent as shown and connected to the pressure gauge by means of connector 60.

Tapered apertures are provided in frame 56 to receive the tapered terminal of an accordian type of metal pressure cell 61, the movable head of which carries a conical point 61p of insulating material, and to receive the tapered terminal of the valve seat and guide element 62 of the pressure release valve. Each of the aforesaid elements has an aperture 63 that coincides with conduit 56c and in turn connects with an axial aperture leading to its operative portion, as shown clearly in Fig. 2.

A length of straight rod of slightly smaller diameter may be passed through tube 48d (when straight) and inserted in said conduit and apertures 63 to assure their alignment and to serve as a holding tool while tightening nuts 64. After the tapered terminals are thus drawn firmly into their respective sockets, said rod may be removed and then tube 48d may be bent and connected to the pressure gauge as previously described.

Threaded apertures may be provided in the base leg of the frame in alignment with said tapered apertures to receive threaded spindle 65 and shaft 66. An axial aperture in said spindle is adapted to receive the shank of conical headed thrust pin 67 of insulating material such as Bakelite, the same being forced into operative engagement with pivotally supported contact member 68 by means of compression spring 69. The insulating conical point 61p of the pressure cell engages the opposite side of said contact arm, the pivotal support of which consists of pin 70 in a pivot block of insulating material 71 that covers aperture 56a and is removably secured to the top leg of frame 56 by means of screws 72.

It will be apparent to those skilled in the art that pressure cell 61 can expand and contract axially, and will exert a usable axial force proportional to the gauge pressure of the fluid within it; and that said pressure cell will compress spring 69 and move contact member 68 in one direction until said spring exerts an equal and opposite force. Likewise when the fluid pressure within expansive cell 61 decreases, compressed spring 69 will expand and move contact member 68 in the opposite direction until said spring exerts a force equal and opposite to that of the pressure cell.

Hence said contact arm will move in either direction from the normal vertical position in the direction of the greater of and a distance proportional to the difference between the opposing forces of said pressure cell and spring, respectively, when either force is varied.

The inner end of threaded shaft 66 pivotally engages a recess in the end of a parallelopiped block of insulating material 73, the other end of which is held against rotational movement and guided for axial movement by the square aperture in the outer end of element 62. Said guided end of insulating block 73 is provided with an aperture to receive the shank of conical headed valve 74 which is forced against the valve seat of element 62 by means of compression spring 75.

A pair of contact posts 76 are fixedly supported by said insulating block, and contact screws 77 carrying lock nuts are adjustably positioned in said contact posts to receive and alternately engage the contacts of member 68. Slots 62s shown in the guide portion of element 62 serve as apertures for the escape of air from the relief valve, and also prevent right contact post 76 and contact screw 77 from touching the metal of said element.

A sleeve and pinion element 78 is rotatively mounted on shaft 66 with the teeth of said pinion meshing with the teeth of a gear 65g fixedly secured to spindle 65. An adjustment knob 79 is adapted to fit on the end of the sleeve of element 78, and is secured thereto by means of set screw 80 which also is adapted to lock said sleeve to said shaft so the two will rotate together after the adjustments hereinafter described are made. The foregoing description explains in detail the construction of the preferred form of an important combination of correlated elements for my tire inflation control unit, comprising an adjustable fluid pressure operated electric contactor having alternate contacts correlated with the adjustment mechanism of an adjustable fluid pressure operated relief valve. The coordinating adjustments for the combination are hereinafter explained.

The outer end of spindle 65 is provided with a hole through which a flexible cable 81 is passed, and then wrapped several times around said spindle and around a small sleeve 82s carrying a pointer 82p, which may be pivotally mounted in a central aperture in the glass covering the face of pressure gauge 58, as shown in Fig. 4, holes being provided in the case of said gauge for said cable. The slack in the aforesaid cable is taken up by spring 81s, which also permits the cable to expand and contract with changes in atmospheric conditions. It will be understood that the aforesaid pointer and sheave do not interfere with the usual operation of pointer 58p which is actuated by the gauge mechanism.

The final unit comprising the air pressure control device is preferably a built-in electric relay, the actuating element of which is an electromagnet having an iron core 82c and pole pieces 82p that form a bobbin on which the insulated wire of coil 95 is wound, the terminals thereof being indicated at 83 for the purpose of the wiring diagram. The design of the magnet winding is such that it will produce the required magnetic characteristics without undue heating when connected in series with the electro-magnet clutch.

Said electro-magnet may be removably secured between the base and opposite leg of frame 56 by means of screw 84a and a screw and nut combination 84b. Screw 84a also mechanically secures terminal 85 of the relay to frame 56, from which it is electrically insulated by means of pieces of insulating material 86a and 86b.

Relay armature 87 of magnetic material may have one end pivotally supported in an aperture in frame 56 on pin 88, its downward movement at the other end being limited by projection 56p of said frame. Both gravity and spring 87s are effective in urging said armature to the normal position illustrated, the force of said spring being adjustable by means of screw 84b, the nut on which serves to lock the screw and secure the end of the magnet to the base of the aforesaid frame. Contact spring 87c may be fixedly secured to said armature mechanically by means of rivets 87r and insulated therefrom electrically by pieces of insulating material 86c and 86d. A headed pin 82s of non-magnetic material may be used to prevent armature 87 from sticking to the pole piece due to residual magnetism. Contact screw 85s and the accompanying lock nut provide for any necessary adjustment of the main contacts of the relay.

The insulated conductors used to connect the several electrical parts of the air pressure control device are indicated diagrammatically for the sake of clearness by means of dot and dash lines, heavy dots being used to indicate preferred soldered terminal connections. Apertures may be provided in the base and opposite leg of frame 56 through which the conductors may be inserted to facilitate wiring the device at the factory, as shown in Fig. 2.

A condenser 89 of suitable capacity to prevent excessive sparking at the relay contacts is fixedly secured mechanically to base 56, and electrically connected to said contacts by means of conductors 90a and 90b, as shown in Fig. 1.

Grooves 56g are provided in frame 56 to receive inturned flanges of metal cover 91 which is removably secured to said frame by means of screw 92. It will be noted that this cover cooperates with the base portion of the frame to enclose and protect the principal control elements. A flexible conduit 91c may be used to protect the exterior electrical conductors 94b.

The preferred method of installing the air pressure control device is to provide apertures in metal instrument panel 46 to receive the face portions of instruments 57 and 58, the sleeve of element 78 and screws 92a and 92b. The device may then be positioned behind said panel and said screws screwed into threaded holes in the base of frame 56 to hold it firmly to the panel, as shown in Fig. 2. When thus installed it will be apparent that the instrument panel and said base form a protective enclosure for gears 65g and 78, and other operative elements.

Adjustment

The device is adjusted at the normal air pressure for the tires of the vehicle. Assuming that said tires are inflated to said pressure, and that the calibration of gauge 58 is such that said pressure will be about one half of the full scale reading, pointer 58p will stand approximately vertical. The length and strength of spring 75 are made such that relief valve 74 is forced from its seat when the air pressure is increased the desired marginal amount, usually about ten percent of the normal pressure, and the center of the space between contact screws 77 is in vertical alignment with pivot pin 70 of contact member 68, knob 79 being used to turn threaded shaft 66 to secure this adjustment. Set screw 80 is then released so only sleeve and pinion element 78 and in turn spindle 65 respond when said knob is turned.

Likewise the length and strength of spring 69 are made such that contact member 68 is forced to the vertical position by pressure cell 61 for the aforesaid air pressure when pointer 82p coincides with the position of pointer 58p. Set screw 80 then is tightened so knob 79 will operate both screw shaft 66 and threaded spindle 65.

The desired permissible variation in the air pressure of the system above and below normal before contact member 68 engages either of contact screws 77 is had by changing said air pressure the desired amount and then adjusting the respective screws to just make contact.

Current for the operation of the electro-magnet clutch is made available by closing switch 93. Since the air compressor is operative only when the engine is running, switch 93 may be and preferably is the switch for the usual ignition circuit.

Automatic control

Let it be assumed that both the air pressure of the system and the setting of the controls are at normal, as would be indicated by the coincidence of pointers 58p and 82p at about the middle of the gauge scale. In case the air pressure of the system decreases for any reason below the permissible margin, the decreased air pressure permits spring 69 to force member 68 into electrical connection with right contact 77, as shown in Fig. 2. If the engine is running and switch 93 is closed, the aforesaid electrical connection permits current to flow from battery 54 through conductor 94a, switch 93, conductor 94b, current flow indicator 57, conductor 94c, relay coil 95, conductor 96a, contact member 68, right contact 77 and post 76, conductors 96b and 96c, the winding of electro-magnet clutch 52m, the frame "ground" of the car and back to the negative terminal of battery 54.

This flow of current energizes the relay electromagnet which attracts armature 87 carrying contact spring 87c, thus closing the relay contacts and completing a bridging circuit in parallel with the circuit that includes contact member 68 and right contact screw 77, thereby permitting current to flow from the terminal of coil 95 through conductor 94d, contact spring 87c, contact screw 85s and terminal 85, to conductor 96c.

By thus energizing the electro-magnet clutch the driving connection is completed between the engine and air compressor, which pumps compressed air through check valve 50 into the air pressure system. With valves 49 and 45 in their normal open positions, the operation of the air compressor raises the air pressure in the tires until the pressure within cell 61 is sufficient to compress spring 69 enough to force lever 68 into contact with left contact screw 77. When said contact is made, a low resistance bridging path is established between the terminals of relay coil 95 through said contact elements and conductor 96a, thus greatly weakening the current in said relay coil and permitting armature 87 to fall and open the relay contacts, and these in turn interrupt the flow of current to the electromagnet clutch which disconnects the air compressor. Excessive sparking at said relay contacts is prevented by the use of condenser 89 as previously stated.

Obviously the foregoing cycle of operations is repeated when the air pressure again falls sufficiently to decrease the pressure in cell 61 so spring 69 can force member 68 into contact with right contact screw 77. Since the needle of the current indicator, or ammeter, 57 indicates when current flows to the electro-magnet clutch that connects the air compressor to the engine, it will be apparent that it will also indicate the duration and frequency of the use of the air compressor, which are indicative of the air leak conditions of the air pressure system.

Whenever the air pressure increases above the margin allowed for by the adjustments hereinbefore described, as when the air in the tires becomes heated due to use or to higher atmospheric temperature, pressure relief valve 74 is forced from its seat and sufficient air is allowed to escape to reduce the pressure to the value at which spring 75 can again force valve 74 back onto its seat. The slots shown in the guide portion of element 62 and the large length of loosely fitting edges of cover 91 permit the air to escape readily to the atmosphere.

Manual control

In cases where a lower tire pressure is wanted, as when about to traverse a length of rough road, or after the load on the vehicle is reduced, knob 79 is turned in a counter-clockwise direction until pointer 82p indicates the lower pressure desired, as illustrated in Fig. 4 for example.

Since the threads are right hand on shaft 66 and left hand on spindle 65 both are retracted, but because of gears 78 and 65g and the proportions of springs 75 and 69 the pressure in cell 61 causes the end of member 68 to be retracted faster than the rate of retraction of left contact 77, with which it contacts, thus actuating the control mechanism to stop the compressor, if operating, as previously described. It will be apparent from the prior description that said retraction of shaft 86 weakens the force of spring 75 and permits air to escape until the air pressure in the system is reduced to the desired value indicated on the dial of gauge 58 by pointer 82p within the limits determined by the initial adjustments. At that time pointer 58p should be slightly past pointer 82p. The previously described automatic features of the device will then function as before in terms of the newly established lower pressure of reference indicated by pointer 82p.

To raise the tire pressure for travel on paved highways or for the transportation of heavier loads, knob 79 is turned in a clockwise direction until pointer 82p indicates the higher pressure desired. It will be apparent that the pressure then in cell 61 can compress spring 69 only a definite distance, hence advancing spindle 65 by turning said knob to the right simply compresses cell 61 and advances the contact end of member 68 faster than the rate of compression of spring 75. The result is that lever 68 is forced into contact with right screw 77, thus actuating the controls as previously described to start the air compressor, which continues to operate until the desired higher pressure is obtained and the pressure in cell 61 is sufficient to increase the compression of spring 69 until member 68 is forced into contact with left contact 77, thus actuating the controls to stop the compressor. As before, the automatic features of the device then are effective at the higher pressure of reference indicated by pointer 82p to maintain the pressure within the limits determined by the initial adjustments.

Although all of the tires are usually included actively in the controlled air pressure system, it will be apparent that by manipulating valves 45 various portions may be included or excluded, as previously explained, at the will of the driver. This often facilitates securing the desired result where it is necessary to manipulate the air pressure in certain of the tires.

Assuming, for example, that it is desired to reduce the air pressure in the rear tires in order to flatten and thereby increase the traction area of their treads in an attempt to extricate the vehicle from soft earth or sand, in which the rear wheels inadvertantly have been stopped. This is done best by closing all of valves 45 except those connecting tubular leads 7 with manifold 44, and turning control knob 79 to lower the pressure, as previously explained. Obviously the air will escape from the rear tires only until the desired pressure is reached. After extricating the vehicle, said control knob may be turned in the opposite direction to raise the pressure to the desired value for all of the tires, whereupon the air compressor is motivated to pump air into the rear tires only until said pressure is obtained, thus greatly reducing the time required for this special operation. The other valves 45 then may be opened and the system manipulated as before.

Shut off valve 49 may be used to retain the air in the tires in case of an air leak or trouble with any of the apparatus connected to run of tubing 48s that might permit air to escape from the tires.

While I have illustrated and described my control unit mechanism employed in a particular tire inflation system, it will be apparent to those skilled in the art that the combination of coacting elements comprising said control unit may be adapted and applied to other tire inflation systems suitable for trucks of various kinds, busses, and other vehicles using pneumatic tires, and that various changes may be made in the details of construction and arrangement of parts without departing from the purpose and intent of the invention within the scope of the appended claims.

For example, instead of using an air compressor motivated by the engine driving the vehicle, a receiver containing compressed air that may be used also to operate the air brakes of the vehicle, or any other means for supplying a suitable fluid under pressure, may be used. If the system employed uses an air receiver, the electro-magnet clutch of the system illustrated in the diagram of Fig. 1 then may be replaced by an electro-magnet operated valve, which, like said electro-magnet clutch, would be operable to effect air output into the system from said supply means. Although air has been referred to as the fluid used to inflate the tires, it will be understood that any other suitable fluid may be used in connection with my control unit.

What I claim as new and desire to protect by Letters Patent is:

1. In a control unit for tire inflation systems, the combination of a frame, a fluid pressure indicator supported by said frame, an expansive pressure cell fixedly secured at one end to said frame and comprising a thrust terminal at the other end thereof, insulated contact lever means pivotally supported by said frame and engaging with the thrust terminal of said pressure cell, axially movable means supported by said frame opposite the movable end of said pressure cell, thrust pin means axially movable in said adjustment means and abutting said contact lever, spring means intermediate of the head of said pin and the end of said adjustment means, a pair of relatively stationary spaced apart contacts so supported by a slidably supported element that said contacts may be closed alternately with the contacts of said contact arm to control electrical means for effecting fluid input into a tire inflation system, adjustment means movably secured to said frame for simultaneously adjusting the position of said axially movable means and said slidably supported means, conduit means for connecting said pressure cell and said pressure indicator to said system, and pointer means associated with said pressure indicator and actuated by said adjustment means to indicate the resulting fluid pressure in said system corresponding to the setting of said adjustment means.

2. In a control unit for tire inflation systems, the combination of a frame, an expansive pressure cell fixedly secured at one end to said frame and comprising a thrust head at the other end thereof, a contact lever in engagement with the thrust head of said pressure cell and pivotally supported by said frame, a thrust pin having its head in engagement with said contact lever in opposition to the thrust head of said pressure cell, spring means abutting the head of said pin, a spring loaded relief valve fixedly secured to said frame and comprising an axially disposed guide way, a pair of contacts supported by an element slidably positioned in the guide way of said relief valve, said contacts being adapted to close alternately with the contacts of said contact arm to control electrical means for effecting fluid input into a tire inflation system, conduit means for connecting said relief valve and said pressure cell to said tire, adjustment screw means for simultaneously adjusting the compression of the spring of said relief valve through the intermediacy of said slidably positioned element and the force of the spring abutting the head of said pin.

3. In a control unit for tire inflation systems, the combination of a frame, a pressure indicator supported by said frame, an expansive pressure cell fixedly secured at one end to said frame and comprising a thrust head at the other end thereof, a contact lever in engagement with the thrust head of said pressure cell and pivotally supported by said frame, a thrust pin having its head in engagement with said contact lever in opposition to the thrust head of said pressure cell, spring means abutting the head of said pin, a spring loaded relief valve fixedly secured to said frame and comprising an axially disposed guide way, a pair of contacts supported by an element slidably positioned in the guide way of said relief valve, said contacts being adapted to close alternately with the contacts of said contact arm to control electrical means for effecting fluid input into a tire inflation system, conduit means for connecting said relief valve, said pressure cell and said pressure indicator to said tire inflation system, adjustment screw means for simultaneously adjusting the compression of the spring of said relief valve through the intermediacy of said slidably positioned element and the force of the spring abutting the head of said pin, and pointer means motivated by said adjustment means for indicating on the scale of said pressure indicator the resulting fluid pressure in said system corresponding to the setting of said adjustment means.

4. In a control unit for tire inflation systems, the combination of a frame, an adjustable spring-loaded relief valve fixedly secured to said frame, an expansive pressure cell also fixedly secured to said frame, a fluid pressure indicator fixedly supported by said frame and comprising an auxiliary movable pointer, conduit means for connecting said relief valve, said pressure cell and said pressure indicator to said tire inflation system, resilient means adapted to exert a force opposing and balancing that produced by said pressure cell, a pair of relatively stationary spaced apart contacts supported by an element adapted to adjust the force exerted by the spring of said relief valve, other contact means movable by the movement of said pressure cell and said opposing resilient means and adapted to close alternately with said stationary contacts to control electrical means for effecting fluid input into a tire inflation system, adjustment screw means movably secured to said frame for simultaneously adjusting said relatively stationary contacts and relief valve spring and said resilient means, and means motivated by said adjustment screw for positioning the auxiliary pointer of said pressure indicator to indicate on the scale thereof the resulting fluid pressure in said system corresponding to the setting of said adjustment means.

5. In a control unit for tire inflation systems, the combination of a frame, an adjustable spring-loaded relief valve fixedly secured to said frame, an expansive pressure cell secured at one end only to said frame, conduit means for connecting said relief valve and said pressure cell to a tire inflation system, resilient means adapted to exert a force opposing and balancing that produced by said pressure cell, a pair of relatively stationary spaced apart contacts supported by an element adapted to change the compression of the spring of said relief valve, another contact means movable by the movable end of said opposing resilient means, and adapted to close alternately with said stationary contacts to control electrical means for effecting fluid input into said system, screw means in said frame for adjusting the position of said relatively stationary contacts and the compression of the spring of said relief valve concurrently, other screw means in said frame for changing the adjustment of said resilient means, gearing means connecting the two aforesaid screw means, knob means for actuating one of said screws, and pointer means movable relative to the scale of said pressure indicator and actuated by said other screw means to indicate the resulting fluid pressure in said system corresponding to the setting of said screw means by said knob.

6. In a control unit for tire inflation systems, the combination of a frame, an adjustable spring-loaded relief valve fixedly secured to said frame, an expansive pressure cell secured to said frame, conduit means for connecting said relief valve and said expansive pressure cell with a tire inflation system, resilient means adapted to exert a force opposing and balancing that produced by said pressure cell, a pair of relatively stationary spaced apart contacts supported by an element adapted to adjust the force exerted by the spring of said relief valve, contact means movable with the movement of said pressure cell and said resilient means and adapted to close alternately with said relatively stationary contacts to control electrical means for effecting fluid input into said system, and adjustment means movably secured to said frame for simultaneously adjusting said relatively stationary contacts and relief valve spring and said resilient means.

7. In a control unit for tire inflation systems, the combination of a frame, an adjustable spring-loaded relief valve fixedly secured to said frame, an expansive pressure cell fixedly secured to said frame, conduit means for connecting said relief valve and said pressure cell to a tire inflation system, resilient means adapted to exert a force opposing and balancing that produced by said pressure cell, a pair of relatively stationary spaced apart contacts supported by an element adapted to compress the spring of said relief valve, contact means movable by the movement of said pressure cell and said resilient means and adapted to close alternately with said relatively stationary contacts to control electrical means for effecting fluid input into said system, adjustment means movably secured to said frame for simultaneously adjusting said relatively stationary contacts and relief valve spring and said resilient means, and scale and pointer means motivated by said adjustment means for indicating the resulting fluid pressure in said system.

8. In a control unit for tire inflation systems, the combination of a frame comprising conduit means connecting a pair of conical apertures in said frame and terminal means for connecting said conduit means with a tire inflation system, an adjustable spring-loaded relief valve comprising a conical base having apertures therein connecting with said conduit means and removably secured in one of said conical apertures, an expansive pressure cell comprising a conical base having apertures therein connecting with said conduit means and removably secured in the other said conical aperture, resilient means adapted to exert a force opposing and balancing that produced by said pressure cell, a pair of relatively stationary spaced apart contacts supported by an element abutting the spring of said relief valve, movable contact means intermediate of the movable end of said pressure cell and of the abutting portion of said resilient means and adapted to close alternately with said stationary contacts to control electrical means for effecting fluid input into said system, and adjustment means movably secured to said frame for simultaneously adjusting said relatively stationary contacts and relief valve spring and said resilient means.

9. In a control unit for tire inflation systems, the combination of a frame comprising a pair of spaced apart legs, a fluid pressure indicator fixedly secured to said frame, one leg of said frame comprising conduit means for connecting a pair of conical apertures therein with said fluid pressure indicator and with terminal means for connecting said conduit means to a tire inflation system, an adjustable spring-loaded safety valve comprising a conical base having apertures therein connecting with said conduit means and removably secured in one of said conical apertures, an expansive pressure cell comprising a conical base having apertures therein connecting with said conduit means and removably secured in the other said conical aperture, resilient means adapted to exert a force opposing and balancing that produced by said pressure cell, a pair of relatively stationary spaced apart contacts supported by an element abutting the spring of said relief valve, movable contact means intermediate of the movable end of said pressure cell and of the adjacent portion of said resilient means and adapted to close alternately with said stationary contacts to control electrical means for effecting fluid input into said system, and adjustment means in the other leg of said frame for simultaneously adjusting said relatively stationary contacts and relief valve spring and said resilient means, and pointer means actuated by said adjustment means for indicating on the scale of said pressure indicator the resulting fluid pressure in said system corresponding to the setting of said adjustment means.

CARL WIEGAND.